United States Patent
Vilajosana Guillén et al.

(10) Patent No.: US 12,474,288 B2
(45) Date of Patent: Nov. 18, 2025

(54) SYSTEMS FOR DETECTING MOISTURE AND METHODS

(71) Applicant: FUNDACIÓ PER A LA UNIVERSITAT OBERTA DE CATALUNYA, Barcelona (ES)

(72) Inventors: Xavier Vilajosana Guillén, Cardedeu (ES); Joan Antoni Melià Seguí, Barcelona (ES); Jon Lejarreta Andrés, Cerdanyola del Vallés (ES)

(73) Assignee: FUNDACIÓ PER A LA UNIVERSITAT OBERTA DE CATALUNYA, Barcelona (ES)

( * ) Notice: Subject to any disclaimer, the term of this patent is extended or adjusted under 35 U.S.C. 154(b) by 268 days.

(21) Appl. No.: 18/034,284

(22) PCT Filed: Oct. 29, 2020

(86) PCT No.: PCT/EP2020/080466
§ 371 (c)(1),
(2) Date: Apr. 27, 2023

(87) PCT Pub. No.: WO2022/089753
PCT Pub. Date: May 5, 2022

(65) Prior Publication Data
US 2023/0393237 A1    Dec. 7, 2023

(51) Int. Cl.
*G01N 27/22* (2006.01)
*G01S 7/40* (2006.01)
*G01S 13/74* (2006.01)

(52) U.S. Cl.
CPC .......... *G01N 27/223* (2013.01); *G01S 7/4039* (2021.05); *G01S 13/74* (2013.01)

(58) Field of Classification Search
CPC ...... G01N 27/223; G01S 7/4039; G01S 13/74
See application file for complete search history.

(56) References Cited

U.S. PATENT DOCUMENTS

2017/0065464 A1* 3/2017 Heil .................. G06K 7/10366

FOREIGN PATENT DOCUMENTS

| EP | 3611668 A1 | 2/2020 |
|---|---|---|
| WO | WO2008030636 A1 | 3/2008 |

(Continued)

OTHER PUBLICATIONS

J. Meliá -Seguí- and X. Vilajosana, "Ubiquitous moisture sensing in automaker industry based on standard UHF RFID tags," 2019 IEEE International Conference on RFID (RFID), Phoenix, AZ, USA, 2019, pp. 1-8. (Year: 2019).*

(Continued)

*Primary Examiner* — Ladimir Magloire
*Assistant Examiner* — Ashley Brown Raynal
(74) *Attorney, Agent, or Firm* — Peter B Scull

(57) ABSTRACT

A system for detecting moisture including: moisture sensors and a control module including a reader module, the control module is configured to: obtain a numerical value related to the feature of the selected response signal of the sensor element which is shielded against liquid; obtain a numerical value related to the feature of the selected response signal of the sensor element which is not shielded against liquid; determine a difference between the obtained numerical value related to the feature of the selected response signal from the sensor element which is shielded against liquid and the obtained numerical value related to the feature of the selected response signal from the sensor element which is not shielded against liquid; determine the detection of moisture if the determined difference is above or below a threshold. A method of detecting moisture is also provided.

15 Claims, 7 Drawing Sheets

(56) References Cited

FOREIGN PATENT DOCUMENTS

WO     WO2011135328 A2    11/2011
WO     WO2016112911 A1    7/2016

OTHER PUBLICATIONS

Melia-Segui Joan et al., "Ubiquitous moisture sensing in automaker industry based on standard UHF RFID tags", 2019 IEEE International Conference on RFID (RFID), IEEE,Apr. 2, 2019 (Apr. 2, 2019), p. 1-8.

International Search Report and Written Opinion of the International Searching Authority. International Application No. PCT/EP2020/080466 issued by the European Patent Office, mail date Jul. 6, 2021, 15 pages, Rijswijk, Netherlands.

* cited by examiner

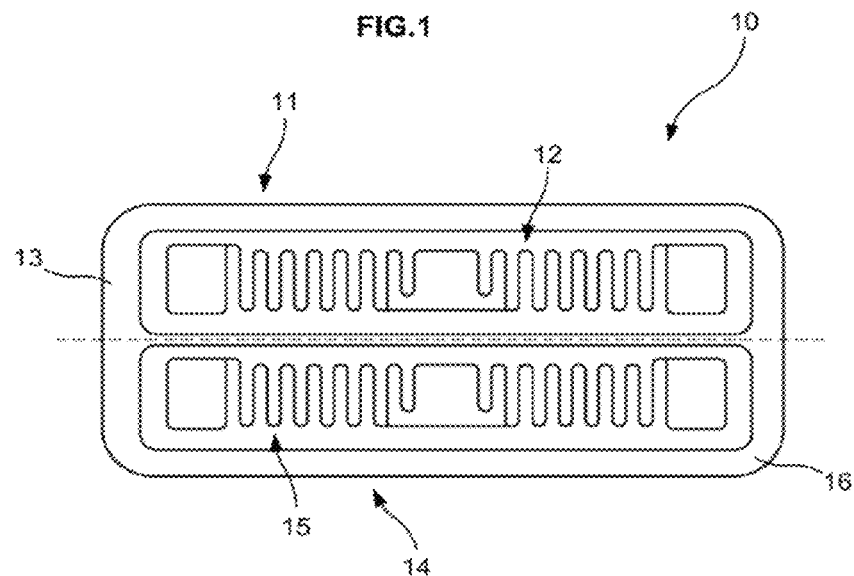
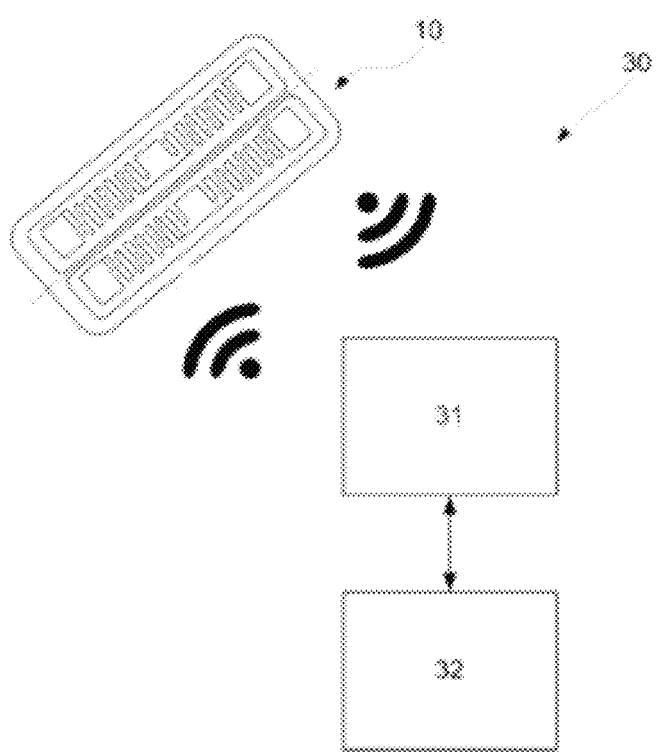

SYSTEMS FOR DETECTING MOISTURE AND METHODS

The present disclosure relates to moisture sensor systems. The present disclosure further relates to methods of detecting moisture.

BACKGROUND

It is known to use moisture sensors in environments such as industry, home or office with the aim of measuring moisture condition changes, that is, for example, to detect liquid (e.g. water) leakages, that can imply vulnerabilities.

The moisture sensors may be wired or wireless sensors. Both wired and wireless sensors have benefits and disadvantages.

In many situations wired sensors are among the most reliable systems as they directly link the sensor to the device that is receiving the input. This means that wired sensors are also the most durable systems which do not need to be replaced often. However, it is noted that wired systems are connected to power, require a large amount of space, are not suitable for moving environments and are much more complicated to maintain. This burden increases in size as more sensors are used based on the application that the sensor is designed for. Consequently, under determined conditions (e.g. in moving elements), wired sensors may be not recommended for sensing moisture.

On the other hand, wireless sensors are becoming more common in the world of sensor-based applications. This is mainly because they are cheaper to install, can be installed in moving elements and are easy to maintain. Wireless radios or transducers can be connected to moisture sensors and actively obtain moisture readings. Active sensors require batteries which increase maintenance and base cost. Passive radios such as Radio-Frequency Identification (RFID) technology, for example, UHF passive RFID labels can also be connected to moisture sensors but this limits their capabilities to respond as more energy is required to power the sensor and some regulations do not allow much more power to be used.

The fundamentals of the moisture detection using a moisture sensor are based on the fact that it is possible to detect the presence of moisture due to changes in the impedance or read voltage from the moisture sensor, when in contact with liquid (for example, when a liquid leakage has occurred).

It is interesting to the industry to use moisture sensors with wireless communication capabilities. The industry requires low cost and low maintenance sensors and hence RFID technology, for example, UHF passive RFID when combined with moisture sensing capabilities are relevant.

However, the use of an RFID radio with a moisture sensor is expensive and usually limits its functionality as the amount of energy required to obtain a significative response is larger than what is possible due to regulations.

Yet, moisture presence implies variations of the antenna-chip impedance matching, which in turn generates variations in the perceived signal.

In a typical deployment, the wireless moisture sensors require to be read (i.e. the reader sends a signal to the sensor and reads its response) at least twice. In a first time, the wireless moisture sensor must be calibrated, that is, the reader needs to obtain a first response signal from the sensor before the sensor is in use. Some features of the obtained first response signal then may be used as reference features for later sensor readings.

This way, for detecting moisture (e.g. when a liquid leakage has occurred), the moisture sensor may be read at least a second time and the features of the obtained second response signal must be compared with the previously obtained reference features.

On the other hand, because the conditions (for example, environmental conditions such as temperature, humidity, etc.) of the first reading and the second reading (or later readings) may be quite different, false positives may occur.

Additionally, e.g. during the assembly process of a vehicle, subsequent "sealing or water tests" may be performed to determine if there are holes, not properly assembled parts, or scratches that may cause water leakages inside the vehicle.

It is known to use a handheld device, carried by an operator, which is configured to measure leakages in strategic points inside the vehicle. It is noted that, during the "sealing tests" and measurement processes in a vehicle's assembly line, the vehicle does not stop at any moment. This is a problem since it is difficult for the operator to access to the interior of the vehicle while the vehicle is displaced along the assembly line.

This approach has further different drawbacks including a training process for the operators, a slow measurement process as the operator needs to measure different points inside the vehicle one by one (e.g. at the end of the production line), a manual reporting of this data which is prone to errors or inaccuracies and hazardous working conditions under high humidity scenarios for the operators. Additionally, the process to measure strategic points inside the vehicle using a handheld device by an operator may take between two and three minutes to be conducted being a major bottleneck in the automatized production chain.

Examples of the present disclosure seek to at least partially reduce one or more of the aforementioned problems.

SUMMARY

In a first aspect, a system for detecting moisture is provided. The system includes one or more moisture sensors including: at least one sensor element which is not shielded against liquid, the sensor element which is not shielded against liquid including: a first RFID label including at least an antenna, and an element made of a liquid absorbing material, the liquid absorbing material being configured to absorb and drive liquid to the antenna of the first RFID label, when liquid is in contact with the antenna of the first RFID label, the strength and/or the phase of a response signal of the antenna is modified; at least one sensor element which is shielded against liquid, the sensor element shielded against liquid including at least an antenna and an element made of a liquid proof material. The system further includes a control module including a reader module, the reader module being configured to receive a plurality of response signals from the sensor element which is not shielded against liquid and receive a plurality of response signals from the sensor element which is shielded against liquid, the control module being configured to: receive a plurality of response signals of the sensor element which is not shielded against liquid, the response signals of the sensor which is not shielded against liquid including a feature, the feature of each received response signal being the same feature; select a response signal of the received plurality of response signals of the sensor element which is not shielded against liquid based on the feature of the response signals such that the selected response signal corresponds to a maximum value of the feature of the selected response signal with respect to the value of the feature of some or all of the other received response signals; receive a plurality of response signals of the sensor element which is shielded against liquid, the response signals of the sensor element which is shielded against liquid including a feature which is the same feature as the feature of the received response signals of the sensor element which is not shielded against liquid; select a response signal of the received plurality of response signals of the sensor element which is shielded against liquid based on the feature of the response signals such that the selected response signal corresponds to a maximum value of the feature of the selected response signal with respect to the value of the feature of some or all of the other received response signals; obtain a numerical value related to the feature of the selected response signal of the sensor element which is shielded against liquid; obtain a numerical value related to the feature of the selected response signal of the sensor element which is not shielded against liquid; determine a difference between the obtained numerical value related to the feature of the selected response signal from the sensor element which is shielded against liquid and the obtained numerical value related to the feature of the selected response signal from the sensor element which is not shielded against liquid; determine a detection of moisture if the determined difference is above or below a threshold.

According to this first aspect, a system for detecting moisture including moisture sensors is provided. The sensors include a sensor element which is shielded against liquid. This element allows the obtaining of a reference response signal to determine the presence of moisture. Because the sensor element which is shielded against liquid is obviously protected against liquids, normally its response signal is not altered or modified with the presence of liquid because its antenna is always dry.

Obviously, for example, external conditions (e.g. temperature provided by the liquid) may alter its response signal but this alteration may be different from the alteration of the sensor element which is not shielded against liquid when is wet and a significant variation between the response signals may be determined. Moreover, such external conditions may modify the response signal of the sensor element which is shielded against liquid and the sensor element which is not shielded against liquid in the same way and thus such alteration of the response signal may not be relevant when a response signal from both sensor elements is obtained to determine the presence of moisture.

On the other hand, the liquid absorbing material of the sensor element which is not shielded against liquid facilitates the contact of the liquid with the antenna so that, in case of presence of liquid, the signal strength and/or the signal phase of its response signal may be altered or modified.

More specifically, the fundamentals of the moisture detection are based on the fact that the liquid absorbing material of the sensor element which is not shielded against liquid absorbs the liquid/moisture and transports it to the non-shielded antenna. When the non-shielded antenna is wet, its matching varies causing a variation in the strength, phase or other features of the response signal.

The system may further include a control module. The control module receives a plurality of response signals of the sensor element which is not shielded against liquid and selects a response signal of the received plurality of response signals of the sensor element which is not shielded against liquid based on the feature of the response signals such that the selected response signal corresponds to a maximum numerical value of the feature with respect to the numerical value of the feature of a plurality (i.e some) or all of the other received response signals. A similar procedure is performed, by the control module, with respect to a plurality of response signals received by the sensor element which is shielded against liquid and thus a response signal corresponding to a maximum numerical value of the feature with respect to the numerical value of the feature of a plurality (i.e. some) or all of the other received response signals is also selected.

The control module may further calculate a difference (i.e. a numerical value) between an obtained numerical value related to the feature of the selected response signal from the sensor element which is shielded against liquid and an obtained numerical value related to the feature of the selected response signal from the sensor element which is not shielded against liquid. This difference between such values may be used to determine if the moisture sensor has been exposed to liquid, that is, it can be determined that, for example, a liquid leakage has occurred if the difference between the above-commented values is above or below a threshold numerical value.

In some examples, the feature of the received response signal includes the signal strength or the signal phase.

In this respect, as commented above, since the presence of liquid/moisture affects the phase and/or the strength of the response signal of the sensor element which is not shielded against liquid, the backscattered strength and/or phase pattern from the sensor element which is not shielded against liquid and the sensor element which is shielded against liquid may be different due to constructive and destructive signals. Also due to the presence of liquid and/or moisture, the matching impedance of the corresponding antennas may be modified as well.

Such effects may modify the (numerical) values of strength or phase obtained from the selected response signal of the sensor element which is shielded against liquid in comparison with the values of strength or the phase of the selected response signals of the sensor element which is not shielded against liquid. As a result, and by measuring a difference between the strength numerical value or phase numerical value of the selected response signals of the sensor element which is shielded against liquid and the corresponding strength numerical value or phase numerical value of the selected response signals of the sensor element which is not shielded against liquid, it may be determined that the moisture sensor is dry or wet.

The above-commented effects may also advance or delay the maximum strength and or phase obtained from the selected response signal of the sensor element which is shielded against liquid in comparison with the strength or the phase of the selected response signals of the sensor element which is not shielded against liquid. As a result, in some other examples, by measuring a time difference between the time employed by the strength or phase of the selected response signals of the sensor element which is shielded against moisture to reach a maximum strength or maximum phase and the time employed by the strength or phase of the sensor element which is not shielded against moisture to reach a maximum strength or maximum phase, it may also be determined that the moisture sensor is dry or wet.

This way, a system for detecting moisture that is simple, relatively fast, cost-effective, and versatile is provided.

According to a second aspect, a method of detecting moisture executable by a control module included in a system for detecting moisture according to the first aspect is provided. The method includes: receiving a plurality of response signals of the sensor which is not shielded against liquid, the response signals of the sensor which is not shielded against liquid include a feature, the feature of each received response signal being the same feature; selecting a response signal of the received plurality of response signals of the sensor element which is not shielded against liquid based on the feature of the response signals such that the selected response signal corresponds to a maximum value of the feature of the selected response signal with respect to the value of the feature of some or all of the other received response signals; receiving a plurality of response signals of the sensor element which is shielded against liquid, the response signals of the sensor element which is shielded against liquid include a feature which is the same feature as the feature of the received response signals of the sensor element which is not shielded against liquid; selecting a response signal of the received plurality of response signals of the sensor element which is shielded against liquid based on the feature of the response signals such that the selected response signal corresponds to a maximum value of the feature of the selected response signal with respect to the value of the feature of some or all of the other received response signals; obtaining a numerical value related to the feature of the selected response signal of the sensor element which is shielded against liquid; obtaining a numerical value related to the feature of the selected response signal of the sensor element which is not shielded against liquid; determining a difference between the obtained numerical value related to the feature of the selected response signal from the sensor element which is shielded against liquid and the obtained numerical value related to the feature of the selected response signal from the sensor element which is not shielded against liquid; determining the detection of moisture if the determined difference is above or below a threshold.

According to this second aspect, a method of detecting moisture is provided. The method is configured to select a response signal between the plurality of received response signals from the sensor element which is shielded against liquid and to select a response signal between the plurality of the received response signals from the sensor element which is not shielded against liquid. The selected response signals may correspond to a maximum numerical value of the feature with respect to the numerical value of the feature of all or some of the other received response signals Since the value of the feature of the response signals received (for each sensor element) may be dependent on the distance between the corresponding sensor element and the reader module, the control module may select the most appropriate response signal to determine the wetness of the sensor. For example, the control module may select a response signal (among all the received response signals) of the corresponding sensor element related to the closest position of the sensor element with respect to the reader module e.g. as the sensor is displaced in the XYZ dimension with respect to the reader module.

Then, numerical values related to the feature of the selected response signals may be compared and a difference may be established. If such difference is above or below a threshold, it may be determined the presence of moisture.

BRIEF DESCRIPTION OF THE DRAWINGS

Non-limiting examples of the present disclosure will be described in the following, with reference to the appended drawings, in which:

FIG. 1 illustrates a schematic diagram of a moisture sensor forming part of a system for detecting moisture, according to some examples;

FIG. 2 illustrates a block diagram of a system for detecting moisture, according to some examples;

DETAILED DESCRIPTION OF EXAMPLES

Figure 3A:
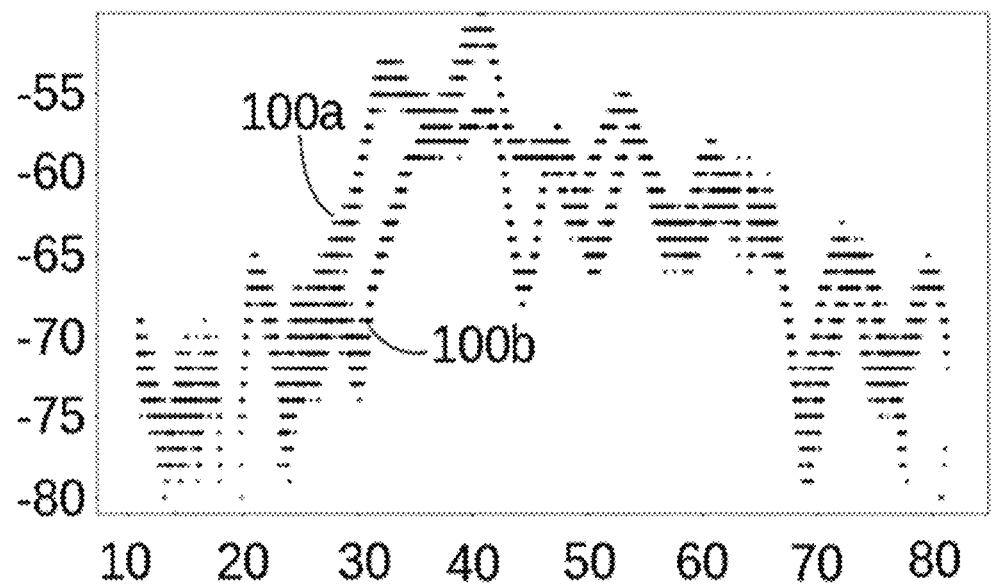
FIG. 3a shows a chart of the behaviour of the strength (RSSI—Received Signal Strength Indicator) of the received response signals, over time, provided by the sensor element which is not shielded against moisture and the sensor element which is shielded against moisture.

As can be seen in FIG. 1, a moisture sensor 10 may include at least one sensor element 11 which is not shielded against moisture. The sensor element 11 which is not shielded against moisture may include a first RFID label including at least an antenna. The sensor element 11 may further include an element 13 made of a liquid absorbing material. Such material is configured to absorb and drive liquid to the antenna of the first RFID label such that, when liquid is in contact with the antenna of the first RFID label, the strength and/or the phase of a response signal of the antenna is modified.

The moisture sensor 10 may further include at least one sensor element 14 which is shielded against moisture. The sensor element 14 which is shielded against moisture may include at least an antenna 15 and an element 16 made of a liquid and/or moisture proof material.

According to a possible configuration of the moisture sensor 10, the sensor element 11 which is not shielded against moisture and the sensor element 14 which is shielded against moisture may be placed next to each other as shown in FIG. 1. Such elements may be situated at a distance between 0.01 centimetres and 30 centimetres, preferably between 0.1 centimetres and 5 centimetres, more preferably 1 centimetre.

This way, the conditions (for example, environmental conditions such as temperature, humidity and so forth) may be the same during the readings for both sensor elements 11,14. As a result, the number of false positives when detecting moisture may be reduced or eliminated.

The element 13 made of a liquid absorbing material may include at least one extension element e.g. a liquid absorbing material tail configured to extend the reach of the element 11 which is not shielded against moisture. Furthermore, the tail may be attached or be attachable to the element 13 made of a liquid absorbing material of the non-shielded sensor element 11. The tail may be placed ad-hoc by the moisture sensor manufacturer or may be placed by the user or the installer of the moisture sensor 10.

In case the moisture sensor 10 includes more than one sensor element 11 which is not shielded against moisture and/or more than one sensor element 14 which is shielded against moisture, the response signal of any or all of the sensor elements may be used for determining the presence of moisture.

Moreover, the configuration of the sensor element 11 which is not shielded against moisture and the shielded sensor element 14 which is shielded against moisture may be equal for assuring that the comparison of features of their corresponding response signals is effective as will be described later on. In examples, this comparison may be performed while the sensor is under movement e.g. situated inside a vehicle during the assembly process of such vehicle, as will be explained later on.

The element 13 made of a liquid absorbing material may be a substrate of the sensor element 11 which is not shielded against moisture. Moreover, the element 16 made of a non-conducting liquid proof material may be a substrate of the shielded sensor element 14.

The liquid absorbing material may be any hydrophilic material such as paper (e.g. litmus paper, blotting paper, paper without glue), absorbent textiles (e.g. cotton, linen, etc.) or synthetic materials (e.g. polyamide microfibers).

The element made of a liquid proof material may be any liquid proof material such as polyethylene derivatives, PVC, etc. This way, the antenna is shielded with a liquid (and moisture) proof material.

The fundamentals of the moisture detection are based on the fact that the liquid absorbing material absorbs the liquid/moisture and transports and drives it to the antenna 12 which is not shielded against moisture of the non-shielded sensor element 11. When the antenna 12 (which is not shielded against moisture) is humidified its matching impedance with the chip (or integrated circuit) varies causing a variation in e.g. the strength, phase or other features of its response signal.

The non-shielded sensor element 11 and/or the shielded sensor element 14 may include a standard RFID label, such as a UHF passive RFID label. In this case, the antenna of the non-shielded sensor element 11 and/or the shielded sensor element 14 is the antenna of the RFID label. An RFID label may include at least three parts: an integrated circuit that stores and processes information and that modulates and demodulates radio-frequency (RF) signals; means for collecting DC power from the incident reader signal; and an antenna for receiving and transmitting the signal.

RFID technology uses electromagnetic fields to automatically identify the labels, which may contain electronically-stored information. In case of passive labels, they collect energy from a nearby RFID reader's interrogating radio waves while active labels have a local power source (e.g. a battery) and may operate hundreds of meters from the RFID reader. An active label has an on-board battery and periodically transmits, for example, its ID signal (i.e. data uniquely identifying the label).

FIG. 2 illustrates a block diagram of a system for detecting moisture, according to some examples. A sensor 10 for the detection of moisture as hereinbefore described may be included in a system 30 for detecting moisture. The system 30 may further include a reader module 31 configured to receive one or more response signal from the non-shielded sensor element and one or more response signal from the shielded sensor element included in the moisture sensor 10 and to obtain one or more features of the response signal (e.g. the strength and/or the phase) received from the non-shielded sensor element and the same feature of the response signal (e.g. the strength and/or the phase) received from the shielded sensor element 14. The system may further include a control module 32.

The reader module 31 may include, for example, one or more antennas e.g. a static set of antennas (e.g. an arch of antennas) or at least one hand-held reader.

The benefits of using a hand-held device are a larger flexibility for reading each moisture sensor, and avoiding the need for the antenna infrastructure, and thus, being able to perform the reading operation at different places.

Since the sensor elements (shielded and non-shielded) of the moisture sensor 10 may include RFID labels, information from the moisture sensor may be wirelessly retrieved from standard RFID readers (i.e. the reader module 31), using standard operations. A RFID reader 31 may be composed of:

One or more antennas: each antenna is used to send energy to the labels using radio frequency waves, sending requests to the labels, and receiving response signals from the labels;

Radio frequency module: each antenna is connected to a radio frequency module responsible to transform information to/from radio frequency waves;

Electronics: responsible to transmit information between the radio frequency module and the information system;

Information system: stores the necessary operations and commands to operate the whole reader system.

Other alternative wireless technologies to RFID may be used to obtain response signals from the sensor elements of the moisture sensor 10, such as short-range communication technologies, for example, Bluetooth (e.g. BLE—Bluetooth Low Energy), NFC, Zigbee or WiFi technology.

In case of using any other wireless technologies (for example, any of those described above), the configuration of the reader module 31 may be the same but adapted to the corresponding technology.

The RFID label information is stored in a non-volatile memory. An RFID reader 31 may transmit an encoded radio signal to interrogate the label. The RFID label receives the radio signal and may respond (i.e. the response signal) with its identification and other information. This may be only a unique label serial number and, since each label have individual serial numbers, the system may discriminate among several labels that may be within the range of the RFID reader and read them simultaneously.

In the case of the present moisture sensor 10, the RFID reader 31 transmits an encoded radio signal to interrogate each label of the moisture sensor 10 and receives a response signal from each RFID label, that is, each sensor element (shielded and non-shielded). Then, the RFID reader module 31 obtains at least one feature and data of each response signal and the at least one feature is sent to the control module 32.

The control module 32 may include or may be implemented by electronic system, apparatus or method, computing system, apparatus or method or a combination of them, that is, the electronic or computing system, apparatus or method may be used interchangeably so that a part of the described system, apparatus or method may be electronic system, apparatus or method and the other part may be computing system, apparatus or method, or all described system, apparatus or method may be electronic system, apparatus or method or all described systems, apparatuses or methods may be computing system, apparatus or method.

Examples of a control module 32 including only electronic system, apparatus or method (that is, a purely electronic configuration) may be a programmable electronic device such as a CPLD (Complex Programmable Logic Device), an FPGA (Field Programmable Gate Array) or an ASIC (Application-Specific Integrated Circuit).

Examples of a control module 32 including only computing system, apparatus or method may be a computer system (e.g. a laptop, a server, a desktop computer, an embedded or industrial computer, etc.), which may include a memory and a processor, the memory being adapted to store a set of computer program instructions, and the processor being adapted to execute these instructions stored in the memory in order to generate the various events and actions for which the control module has been programmed.

The computer program may include program instructions for causing the control module 32 to perform a method of detecting moisture (e.g. due to a liquid leakage) that will be described later. The computer program may be embodied on a storage medium such as a ROM, for example a CD ROM or a semiconductor ROM, a magnetic recording medium, for example a hard disk, a solid-state disk (SSD), a USB flash drive (for example, a pen drive); or a non-volatile memory card such as a SD, miniSD or microSD card. In addition, the computer program may be carried on a transmissible carrier such as an electrical or optical signal, which may be conveyed via electrical or optical cable or by radio or other system, apparatus or method.

When the computer program is embodied in a signal that may be conveyed directly by a cable or other device or system, apparatus or method, the carrier may be constituted by such cable or other device or system, apparatus or method.

Alternatively, the carrier may be an integrated circuit in which the computer program is embedded, the integrated circuit being adapted for performing, or for use in the performance of, the relevant methods.

The computer program may be in the form of source code, object code, a code intermediate source and object code such as in partially compiled form, or in any other form suitable for use in the implementation of the method. The carrier may be any entity or device capable of carrying the computer program.

Moreover, the control module 32 may also have a hybrid configuration between computing and electronic system, apparatus or method. In this case, the control module may include a memory and a processor to implement computationally part of its functionalities and certain electronic circuits to implement the remaining functionalities.

In some examples, as commented above, the reader module 31 may require placing one or more antennas able to retrieve information from the moisture sensor 10 (i.e. from the element which not shielded against moisture and the element which is shielded against moisture forming part of such sensor).

In any case, the control module 32 may be configured to execute a method of detecting moisture (for example, due to a liquid leakage), the method including:
    receiving a plurality of response signals of the sensor which is not shielded against liquid, the response signals of the sensor which is not shielded against liquid including a feature, the feature of each received response signal being the same feature;
    selecting a response signal of the received plurality of response signals of the sensor element which is not shielded against liquid based on the feature of the response signals such that the selected response signal corresponds to a maximum value of the feature of the selected response signal with respect to the value of the feature of some or all of the other received response signals;
    receiving a plurality of response signals of the sensor element which is shielded against liquid, the response signals of the sensor element which is shielded against liquid including a feature which is the same feature as the feature of the received response signals of the sensor element which is not shielded against liquid;
    selecting a response signal of the received plurality of response signals of the sensor element which is shielded against liquid based on the feature of the response signals such that the selected response signal corresponds to a maximum value of the feature of the selected response signal with respect to the value of the feature of some or all of the other received response signals;
    obtaining a numerical value related to the feature of the selected response signal of the sensor element which is shielded against liquid;
    obtaining a numerical value related to the feature of the selected response signal of the sensor element which is not shielded against liquid;
    determining a difference between the obtained numerical value related to the feature of the selected response signal from the sensor element which is shielded against liquid and the obtained numerical value related to the feature of the selected response signal from the sensor element which is not shielded against liquid;
    determining the detection of moisture if the determined difference is above or below a threshold.

As will be explained with more detail later on with reference to FIG. 5, the moisture sensor 10 may be displaced in XYZ dimension with respect to the reader module. For example, it may be situated within a vehicle, in places where it may be important to check whether water has been leaked during a "water test" performed during the assembly of such vehicle. The assembly line may be provided with a vehicle transfer mechanism configured to displace the vehicle along such assembly line. As the vehicle (with the moisture sensor 10 placed inside) is displaced along the assembly line using the vehicle transfer mechanism (and thus it is displaced in the XYZ dimension), one of the antennas forming part of the reader module 31 may interrogate (e.g. at the same time or at about the same time) the shielded and non-shielded sensor elements of the moisture sensor 10 and receive a plurality of response signals from the sensor element which is not shielded against moisture and a plurality of response signals the sensor element which is shielded against moisture, both forming part of the sensor 10.

Following the example, the reader module 31, from each response signal received from each sensor element (shielded and non-shielded) forming part of the sensor 10, it may obtain specific features and it may generate samples including a data structure such as:

| Moisture sensor | | |
|---|---|---|
| | Label 1 | Label 2 |
| Timestamp | $Time_1$ | $Time_2$ |
| Electronic Product Code | $EPC_1$ | $EPC_2$ |
| Received Signal Strength Indicator (RSSI) | $RSSI_1$ | $RSSI_2$ |
| Radio Frequency Phase (PHASE) | $PHASE_1$ | $PHASE_2$ |
| Other high or low level data | $X_1$ | $X_2$ |

For instance, a first sample from the moisture sensor 10 received by one antenna forming part of the reader module 31 may include the following information:

$$A^1 := \{Time^1_1, EPC^1_1, RSSI^1_1, PHASE^1_1, X^1_1, Time^1_2, EPC^1_2, RSSI^1_2, PHASE^1_2, X^1_2\}$$

in which Label 1 may be the non-shielded sensor element and Label 2 may be the shielded sensor element forming part of the sensor 10.

Consequently, the reader module 31 may interrogate (e.g. at the same time or at about the same time) the non-shielded sensor element 11 and the shielded sensor element 14 so that a response signal of each sensor element (shielded and non-shielded) is obtained under the same conditions. Then, the reader module 31 may obtain at least one feature (e.g. signal strength and/or signal phase.) from each response signal and may also obtain data (e.g. data uniquely identifying each sensor element) and send them to the control module 32 to be processed.

The control module 32 may select one response signal among all (or some) the response signals received by the element which is shielded against moisture as will be explained later on with reference to FIGS. 3a and 3b Particularly the response signal corresponding to the closest distance between the sensor element and the antenna of the reader module 31 e.g. as the sensor is displaced in the XYZ dimension with respect to an antenna of the reader may be selected. The control module 32 may further select one response signal among all (or some) the response signals received by the element which is shielded against moisture, particularly the response signal corresponding to the closest distance between the shielded sensor element and the reader module 31 as the sensor is displaced in the XYZ dimension with respect to an antenna of the reader. As a result, a sample as hereinbefore described, corresponding to the response signals of both sensor elements (shielded and non-shielded) situated closest to an antenna of the reader module, as the sensor is displaced in the XYZ dimension with respect to the reader module, is also selected. It is noted that the numerical values of the strength and/or the phase of the selected response signals, emitted by the sensor element which is shielded against liquid and/or the sensor element which is not shielded against liquid, may correspond to a maximum numerical value of strength or phase with respect to the corresponding numerical values of strength or phase of some (or all) of the remaining non-selected received response signals.

In any case, the control module 32 may process the selected sample (including information of the selected response signal from the sensor element which is not shielded against moisture and the selected response signal from the sensor element which is shielded against liquid) and determine the presence of moisture as will be describe later on with reference to FIGS. 4a-4d.

In summary, the reader module 31 may receive a plurality of response signals from each sensor element of the same moisture sensor. However, it may be necessary to select a single response signal among all the response signals received by the shielded element and select a single response signal from all the response signals received by the non-shielded element. Different ways to select the most appropriate response signal among the plurality of responses signals received by an antenna of the reader module 31 are explained with reference to FIGS. 3a and 3b.

FIG. 3a shows a chart of the behaviour of the strength (RSSI—Received Signal Strength Indicator) of the response signals, overtime, provided by the sensor element which is not shielded against moisture and the sensor element which is shielded against moisture, as the moisture sensor is displaced along the XYZ dimension from one point to another with respect to an antenna of a reader module as hereinbefore described. For example, as commented above, the sensor may be situated inside a vehicle to be assembled and the vehicle may be displaced along an assembly line.

The reference sign 100*a* corresponds to the behaviour of the strength (RSSI—Received Signal Strength Indicator) of the response signals, over time, provided by the sensor element which is not shielded against liquid, as the moisture sensor is displaced in the XYZ dimension. The reference sign 100*b* corresponds to the behaviour of the strength (RSSI—Received Signal Strength Indicator) of the response signals, over time, provided by the sensor element which is shielded against liquid, as the moisture sensor is displaced in the XYZ dimension. It is noted that the signal strength numerical value is dependent on the distance between the sensor element which is not shielded against moisture or the sensor element which is shielded against moisture (as the sensor is displaced in the XYZ dimension) and the antenna of the reader module, together with constructive or destructive effects due to phase, plus other minor RF effects.

In this respect, a plurality of response signals each including a signal strength numerical value 100*a* may be received (by the reader module) regarding the sensor element which is shielded against liquid, over time, while the sensor is displaced along the XYZ dimension. The data may be sent to be control module to be processed. Particularly, the control module is configured to compare the received signal strength numerical values 100*a* and select a response signal corresponding to the maximum signal strength value among all of the plurality of received strength numerical values of the received response signals.

Similarly, a plurality of response signals each including a signal strength numerical value 100*b* may be received (by the reader module) regarding the sensor element which is not shielded against liquid, over time, as the sensor is displaced in the XYZ dimension. This information may be sent to the control module to be processed. The control module 32 is configured to compare the received signal strength numerical values 100*b* and select the response signal corresponding to the maximum signal strength numerical value among all the signal strength numerical values of the received response signals.

Then, from the selected response signal of the non-shielded element and the selected response signal of the shielded element, both forming part of the same sensor for detecting moisture, a sample may also be created including a data structure as hereinbefore described.

Figure 3B:
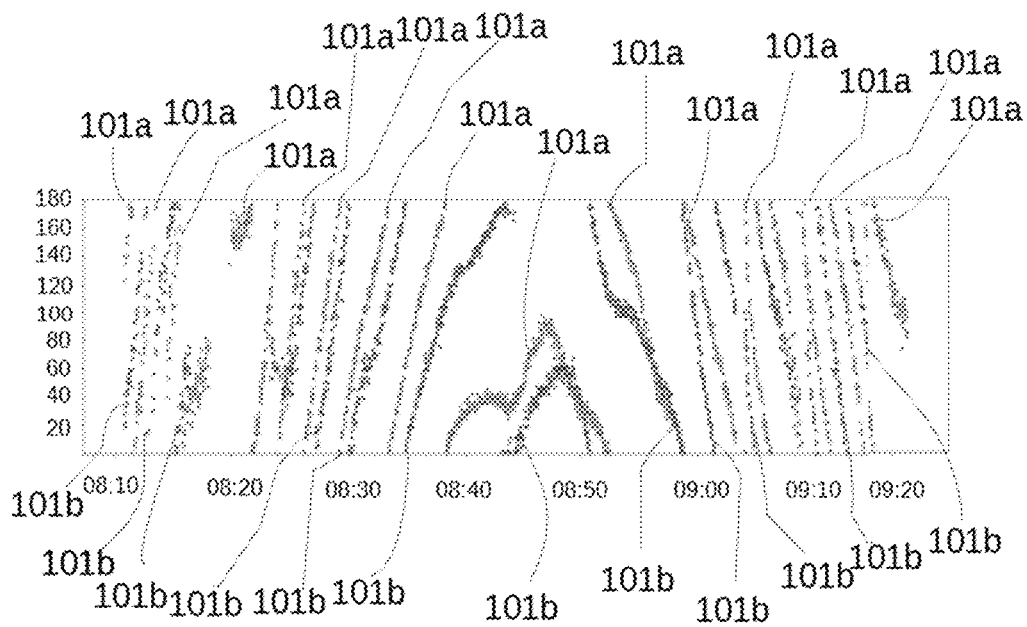
FIG. 3b shows a chart of the behaviour of the phase of the received response signals, in a frequency channel of 866.061 Mhz, over time obtained from the sensor element which is shielded against liquid and the sensor element which is not shielded against liquid of a moisture sensor.

FIG. 3b shows a chart of the behaviour of the phase of the response signals, in a frequency channel of 866.061 Mhz, over time (minutes:seconds) obtained from the non-shielded sensor element and the shielded sensor element of a moisture sensor as hereinbefore described, as the sensor is displaced in the XYZ dimension (e.g. the sensor may be situated inside a vehicle to be assembled and the vehicle may be displaced along such assembly line) with respect to an antenna of a reader module as hereinbefore described. The reference sign 101a corresponds to the behaviour of the phase of the response signal(s), over time, provided by the sensor element which is not shielded against moisture, as the moisture sensor is displaced in the XYZ dimension with respect to an antenna of the reader. The reference sign 101b corresponds to the behaviour of the phase of the response signal(s), over time, provided by the sensor element which is shielded against moisture, as the moisture sensor is displaced in the XYZ dimension with respect to the antenna of the reader. It is noted that the phase information is directly dependent on the distance between either the non-shielded sensor element or the shielded sensor element forming part of the same moisture sensor and an antenna of a reader module as hereinbefore described.

As can be seen in the FIG., as the moisture sensor is displaced in the XYZ dimension with respect to an antenna of the reader module, the phase 101a of the response signal of the sensor element which is not shielded against moisture is increased until the numerical value of 180 degrees (time around 08:11) is reached and then in a relatively short time is decreased to 0 degrees. In some other examples, the phase 101a of the response signal of the sensor element which is not shielded against moisture may be increased until some other numerical values e.g. 360 degrees. Following the example, at this point, the phase 101a of the response signal is increased again until the numerical value of 180 degrees is reached again (time around 08:12) and then in relatively short time is decreased to 0 degrees. This process repeats until the sensor element which is not shielded against moisture reaches the closest point with respect the antenna of the reader module. At this point (time around 09:08:46), the phase stops increasing (before 180 degrees) and starts decreasing from a phase value around 100 degrees. This phase value ("inflexion point") represents the closest point of the non-shielded sensor element with respect to the antenna of the reader module, as the sensor is displaced in the XYZ dimension and thus the response signal corresponding to such phase value is selected.

The control unit may thus be configured to identify an increase slope of the phase in (at least) some of received response signals of the sensor element which is not shielded against moisture, the slope including the (at least) some of the received response signals which phase raises from an initial phase (of 0 degrees) to a (relative) maximum phase (of around 100 degrees) during a first period of time (around seven seconds). The control unit may further be configured to identify a decrease slope of the phase in at least some of the received response signals, the slope including the (at least) some of the received response signals which phase decreases from the (relative) maximum phase (of around 100 degrees) to the initial phase (of 0 degrees) during a second period of time (five seconds), the end of the first period of time and the beginning of the second period of time being the same. As a result, a response signal corresponding to such (relative) maximum phase numerical value (of around 100 degrees) may be selected i.e. the above-commented phase numerical value corresponding to time around 09:08:46. It is noted that the selected response signal corresponds to a (relative) maximum signal phase value among the phase values of some of the plurality of received response signals (e.g. the response signals included in the time period between 08:36 and 08:55).

Similarly, as the moisture sensor is displaced in the XYZ dimension, the phase 101b of the response signal of the sensor element which is shielded against moisture is increased until the numerical value of 180 degrees (time around 09:08:12) is reached and then in a relatively short time is decreased to 0 degrees. At this point, the phase 101b of the response signal is increased again until the numerical value of 180 degrees is reached again (see 09:08:15) and then in relatively short time is decreased to 0 degrees. This process repeats until the sensor element which is shielded against moisture reaches the closest point with respect the antenna of the reader module. At this point (09:08:48), the phase stops increasing and starts decreasing from a phase numerical value around 65 degrees i.e. a phase numerical value which is less than 180 degrees. This phase numerical value represents the closest point of the non-shielded sensor element with respect to the antenna of the reader module, as the sensor is displaced in the XYZ dimension and thus the response signal corresponding to this phase numerical value is selected. It is noted that the selected response signal corresponds to a (relative) maximum signal phase numerical value among the plurality of phase numerical values of some of the plurality of received response signals (e.g. the response signals included in the time period between 08:43 and 08:53). It is noted that this point corresponds to an "inflexion point" of the curve.

Therefore, the control unit may also be configured to identify an increase slope of the phase in (at least) some of the received response signals of the sensor element which is shielded against moisture, the slope including the (at least) some of the received response signals which phase raises from an initial phase to a maximum phase during a first period of time. The control unit may further be configured to identify a decrease slope of the phase in (at least) some of the received response signals, the slope including the (at least) some of the received response signals which phase decreases from the maximum phase to the initial phase during a second period of time, the end of the first period of time and the beginning of the second period of time are the same. As a result, a response signal corresponding to such (relative) maximum phase may be selected i.e. the above-commented phase numerical value corresponding to time around 09:08:48.

A sample as hereinbefore described including the data of the selected response signal of the shielded and the non-shielded moisture elements of a moisture sensor is thus also selected.

Figure 4A:
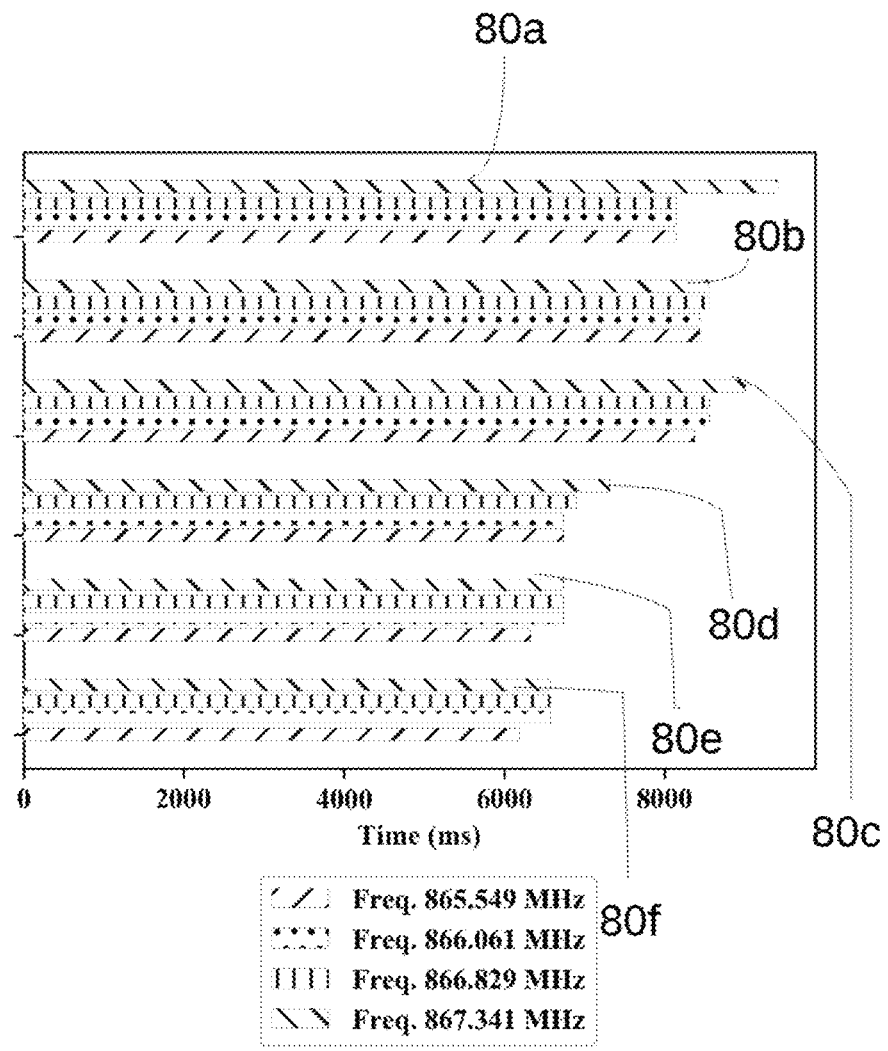
FIG. 4a shows a graphical diagram of a time difference between a time employed by the strength of the selected response signal from the sensor element which is shielded against liquid to reach its strength value and the time employed by the strength of the response signal from the sensor element which is not shielded against liquid to reach its strength value, in different frequency channels, of the sensor for detecting moisture, according to some examples.

FIG. 4a shows a graphical diagram of a difference between a time employed by the strength of the selected response signal from the sensor element which is shielded against liquid to reach its strength value (which is a maximum strength numerical value with respect to the strength numerical values of all the remaining non-selected response signals) and the time employed by the strength of the response signal from the sensor element which is not shielded against liquid to reach its strength numerical value (which is a maximum strength numerical value with respect to all the remaining non-selected response signals), in different frequency channels, of a sensor for detecting moisture, according to some examples.

In this FIG., for a first frequency channel of 867.341 Mhz, the time difference (ms) between the time employed by the strength of the selected response signal of the sensor element which is shielded against moisture (of a sensor for detecting moisture as hereinbefore described) to reach its strength value and the time employed by the strength of the selected response signal from the sensor element which is not shielded against liquid to reach its strength value, in different tests, is described by the charts 80a-80g. The charts 80a-80c refer to "dry" test i.e. a test where there is no presence of moisture and the charts 80d-80f refer to "wet" test i.e. a test where there is presence of moisture.

In an example (see chart 80a), the time difference (ms) between the time employed by the strength of the selected response signal of the sensor element which is shielded against moisture to reach its strength numerical value and the time employed by the strength of the selected response signal from the sensor element which is not shielded against liquid to reach its strength value is around 9600 ms. In a further example (see chart 80b), the time difference (ms) between the time employed by the strength of the selected response signal of the sensor element which is shielded against moisture to reach its (maximum) strength numerical value and the time employed by the strength of the selected response signal from the sensor element which is not shielded against liquid to reach its (maximum) strength numerical value is around 8600 ms. In another example (see chart 80c), the time difference (ms) between the time employed by the strength of the selected response signal of the sensor element which is shielded against moisture to reach its (maximum) strength numerical value and the time employed by the strength of the selected response signal from the sensor element which is not shielded against liquid to reach its (maximum) strength numerical value is around 9200 ms. In this example, a threshold may be set at 8600 ms. Time values above this threshold may determine the non-presence of moisture and time numerical values below this threshold may determine the presence of moisture.

In another example (see chart 80d), the time difference (ms) between the time employed by the strength of the selected response signal of the sensor element which is shielded against moisture to reach its strength numerical value and the time employed by the strength of the selected response signal from the sensor element which is not shielded against liquid to reach its strength numerical value is around 7300 ms. In another example (see chart 80e), the time difference (ms) between the time employed by the strength of the selected response signal of the sensor element which is shielded against moisture to reach its strength numerical value and the time employed by the strength of the selected response signal from the sensor element which is not shielded against liquid to reach its strength numerical value is around 6800 ms. In some other example (see chart 80f), the time difference (ms) between the time employed by the strength of the selected response signal of the sensor element which is shielded against moisture to reach its (maximum) strength and the time employed by the strength of the response signal from the sensor element which is not shielded against liquid to reach its (maximum) strength is around 6600 ms. Since the time differences, in all the "wet" tests, are below the previously set threshold of e.g. 8600 ms, it may be determined that, in all such "wet" tests, the sensor is wet i.e. there is moisture present in the sensor.

In this respect, it is noted that since moisture may affect the strength numerical value of the RFID label of the element which is not shielded against moisture of the moisture sensor, the backscattered RSSI pattern from the element which is not shielded against moisture and the element which is shielded against moisture (of the same moisture sensor) may be different due to constructive and destructive signals. Moreover, as commented above, when the antenna of the element which is not shielded against moisture is humidified its matching impedance with the chip (or integrated circuit) varies causing a variation in e.g. the strength of a response signal of such non-shielded element. The above-commented effects may advance or delay the maximum RSSI obtained from the element which is not shielded against moisture in comparison with the element which is shielded against moisture of the same moisture sensor. Hence, measuring the time difference between maximum strength (RSSI) numerical values for both sensor elements in the same moisture sensor may be used as a method to determine whether a moisture sensor as hereinbefore described is dry or wet.

The same is true for any of the remaining frequency channels (e.g., in FIG. 4a, 865.549 Mhz, 866.061 Mhz, 866.829 MHz). A time threshold may be set using one of the first three "dry" tests. Since the time difference in any of the other three "wet" test is below such threshold, the presence of moisture is determined.

It is further noted that, for any of the frequencies channels, if a time threshold is set by any of the "dry" test but a time difference obtained in any of the "wet" test includes a predefined deviation with respect of such threshold e.g. a time deviation above such threshold, a false negative may be determined. In such case, a further procedure for determining moisture as will be described with reference to FIG. 4c may be applied.

Figure 4B:
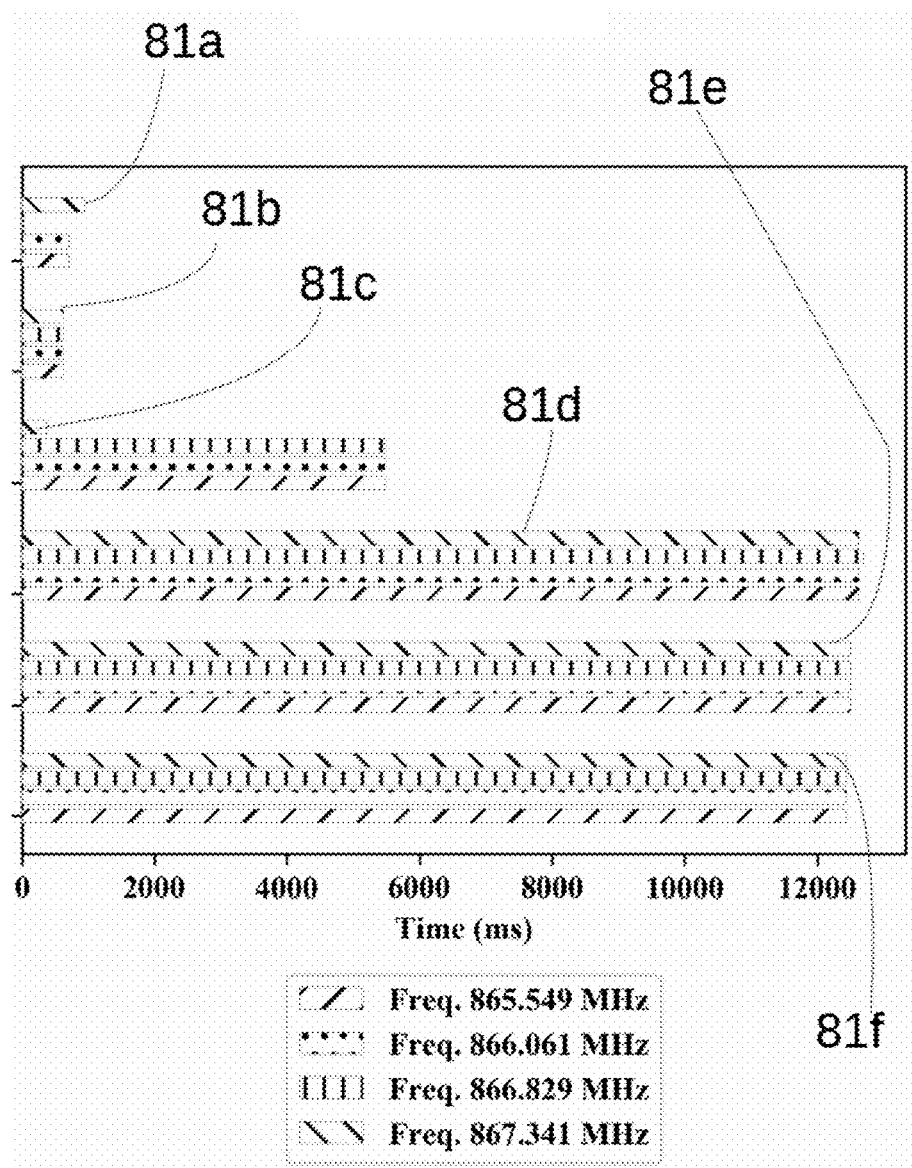
FIG. 4b shows a graphical diagram of a time difference between a time employed by the phase of the selected response signal from the sensor element which is shielded against liquid to reach its phase value and the time employed by the phase of the selected response signal from the sensor element which is not shielded against liquid to reach its phase value, in different frequency channels, of the sensor for detecting moisture, according to some examples.

FIG. 4b shows a graphical diagram of a time difference between a time employed by the phase of the selected response signal from the sensor element which is shielded against liquid to reach its phase value (which is a relative maximum phase numerical value with respect to the phase numerical values of some of the remaining non-selected response signals) and the time employed by the phase of the selected response signal from the sensor element which is not shielded against liquid to reach its phase value (which is a relative maximum phase numerical value with respect to some of the plurality of remaining non-selected response signals), in different frequency channels, of a sensor for detecting moisture.

In this FIG., for a first frequency channel of 865.549 Mhz, the time difference (ms) between the time employed by the phase of the selected response signal of the sensor element which is shielded against moisture (of a sensor for detecting moisture as hereinbefore described) to reach its phase value and the time employed by the phase of the selected response signal from the sensor element which is not shielded against liquid to reach its phase value, in different tests, is described by the charts 81a-81g. The charts 81a-81c refer to "dry" test i.e. a test where there is no presence of moisture and the charts 81d-81f refer to "wet" test i.e. a test where there is presence of moisture.

In an example (see chart 81a), the time difference (ms) between the time employed by the phase of the selected response signal of the sensor element which is shielded against moisture to reach its phase value and the time employed by the phase of the selected response signal from the sensor element which is not shielded against liquid to reach its phase value is around 1000 ms. In a further example (see chart 80*b*), the time difference (ms) between the time employed by the phase of the selected response signal of the sensor element which is shielded against moisture to reach its phase value and the time employed by the phase of the selected response signal from the sensor element which is not shielded against liquid to reach its phase value is around 800 ms. In another example (see chart 80*c*), the time difference (ms) between the time employed by the phase of the selected response signal of the sensor element which is shielded against moisture to reach its (relative maximum) phase value and the time employed by the phase of the selected response signal from the sensor element which is not shielded against liquid to reach its (relative maximum) phase value is around 4500 ms. In this example, a threshold may be set at 4500 ms. Time numerical values below this threshold may determine the non-presence of moisture and time numerical values above this threshold may determine the presence of moisture.

In another example (see chart 81*d*), the time difference (ms) between the time employed by the phase of the selected response signal of the sensor element which is shielded against moisture to reach its phase numerical value and the time employed by the phase of the selected response signal from the sensor element which is not shielded against liquid to reach its phase numerical value is around 12500 ms. In another example (see chart 81*e*), the time difference (ms) between the time employed by the phase of the selected response signal of the sensor element which is shielded against moisture to reach its phase numerical value and the time employed by the phase of the selected response signal from the sensor element which is not shielded against liquid to reach its phase numerical value is around 12200 ms. In some other example (see chart 81*f*), the time difference (ms) between the time employed by the phase of the response signal of the sensor element which is shielded against moisture to reach its (relative maximum) phase numerical value and the time employed by the phase of the response signal from the sensor element which is not shielded against liquid to reach its (relative maximum) phase numerical value is around 12200 ms. Since the time differences, in all the "wet" test, are above the above-commented threshold of e.g. 5500 ms, it may be determined that, in each test, the sensor is wet i.e. there is moisture present in the sensor.

In this respect, it is noted that since moisture may affect the phase numerical value of the RFID label of the element which is not shielded against moisture of the moisture sensor, the backscattered RSSI pattern from the element which is not shielded against moisture and the element which is shielded against moisture (of the same moisture sensor) may be different due to constructive and destructive signals. Moreover, as commented above, when the antenna of the element which is not shielded against moisture is humidified its matching impedance with the chip (or integrated circuit) varies causing a variation in e.g. the phase of a response signal of such non-shielded element. The above-commented effects may advance or delay the phase obtained from the element which is not shielded against moisture in comparison with the element which is shielded against moisture of the same moisture sensor in the selected response signals. Hence, measuring the time difference between (relative maximum) phase numerical values (i.e. inflexion points) for both sensor elements in the same moisture sensor may be used as a method to determine whether a moisture sensor as hereinbefore described is dry or wet.

The same is true for any of the remaining frequency channels (e.g., in FIG. 4*b*, 866.061 Mhz, 866.829 Mhz, 867.341 MHz). Using one of the first three "dry" test, a threshold may be set. Since the time difference in any of the last three "wet" test is above such threshold, the presence of moisture is determined.

It is further noted that, for any of the frequencies, if a threshold is set by any of the "dry" test but a time difference obtained in any of the "wet" test includes a predefined deviation with respect of such threshold e.g. a time deviation below such threshold, a false negative may be determined. In such case, a further procedure for determining moisture as will be described with reference to FIG. 4*d* may be applied.

Figure 4C:
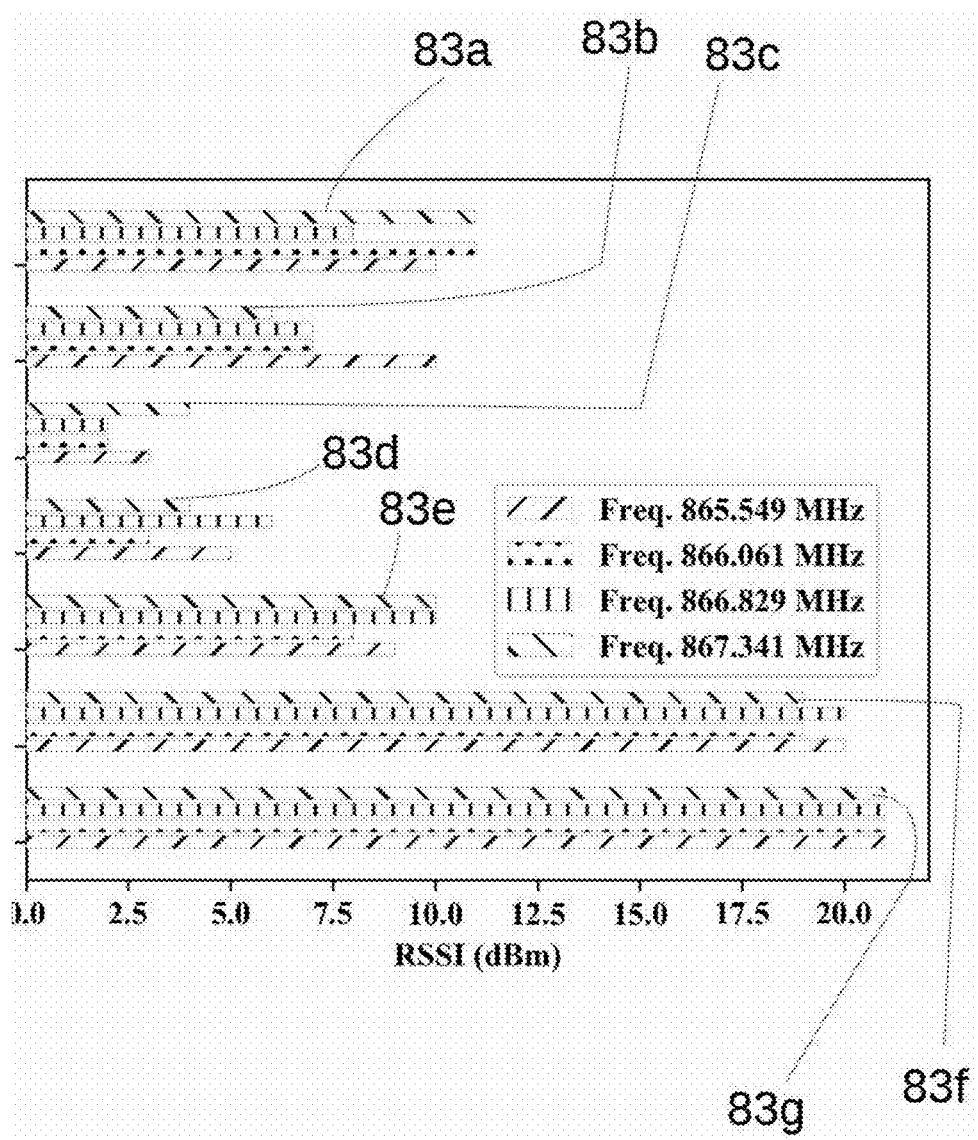
FIG. 4c shows a graphical diagram of a difference between a strength value of the selected response signal of the sensor element which is shielded against liquid and the strength value of the selected response signal of the sensor element which is not shielded against liquid, in different frequency channels, of the sensor for detecting moisture, according to some examples.

FIG. 4*c* shows a graphical diagram of a strength difference between the strength numerical value of the selected response signal from the sensor element which is shielded against liquid and the strength numerical value of the selected response signal from the sensor element which is not shielded against, in different frequency channels, of the sensor for detecting moisture.

The charts 83*a*-83*c* refer to a "dry" test i.e. a test there is no presence of moisture and the charts 83*d*-83*g* refer to a "wet" test i.e. a test there is presence of moisture.

In an example (see chart 83*a*), the strength difference (strength) between the strength numerical value (dBm) of the selected response signal of the sensor element which is shielded against moisture and the strength numerical value (dBm) of the selected response signal from the sensor element which is not shielded against is around 11 dBm. In a further example (see chart 83*b*), the strength difference (dBm) between the strength numerical value of the selected response signal of the sensor element which is shielded against moisture and the strength numerical value of the selected response signal from the sensor element which is not shielded against is around 6 dBm. In another example (see chart 83*c*), the strength difference (dBm) between the strength numerical value of the selected response signal of the sensor element which is shielded against moisture and the strength numerical value of the selected response signal from the sensor element which is not shielded against is around 5 dBm. A threshold may thus be set e.g. at 11 dBm. Strength difference values above this threshold may determine the presence of moisture and strength difference values below this threshold may determine the non-presence of moisture.

In another example (see chart 83*d*), the strength difference (dBm) between the strength numerical value of the selected response signal of the sensor element which is shielded against moisture and the strength numerical value of the selected response signal from the sensor element which is not shielded against is around 4 dBm. In another example (see chart 83*e*), the strength difference (dBm) between the strength numerical value of the selected response signal of the sensor element which is shielded against moisture and the strength numerical value of the selected response signal from the sensor element which is not shielded against is around 10 dBm. It is noted that the strength difference values are below the previously set threshold of 11 dBm and thus a "false" result, in the detection of moisture, may be determined. As a result, a further test for determining moisture as hereinbefore described with reference to FIG. 4*a* may be applied.

Following the example, in another test (see chart 83*f*), the strength difference (dBm) between the strength value of the selected response signal of the sensor element which is shielded against moisture and the strength value of the selected response signal from the sensor element which is not shielded against is around 18 dBm. In another test (see chart 83*g*), the strength difference (dBm) between the strength numerical value of the selected response signal of the sensor element which is shielded against moisture and the strength numerical value of the selected response signal from the sensor element which is not shielded against is around 21 dBm. Since the strength difference numerical values, in these "wet" test, are above the above-commented threshold of e.g. 11 dBm, it may be determined that the sensor is wet i.e. there is moisture present in the sensor.

The same operation applies for any of the remaining frequency channels (e.g. in FIG. 4c, 866.061 Mhz, 866.829 Mhz, 867.341 MHz).

Figure 4D:
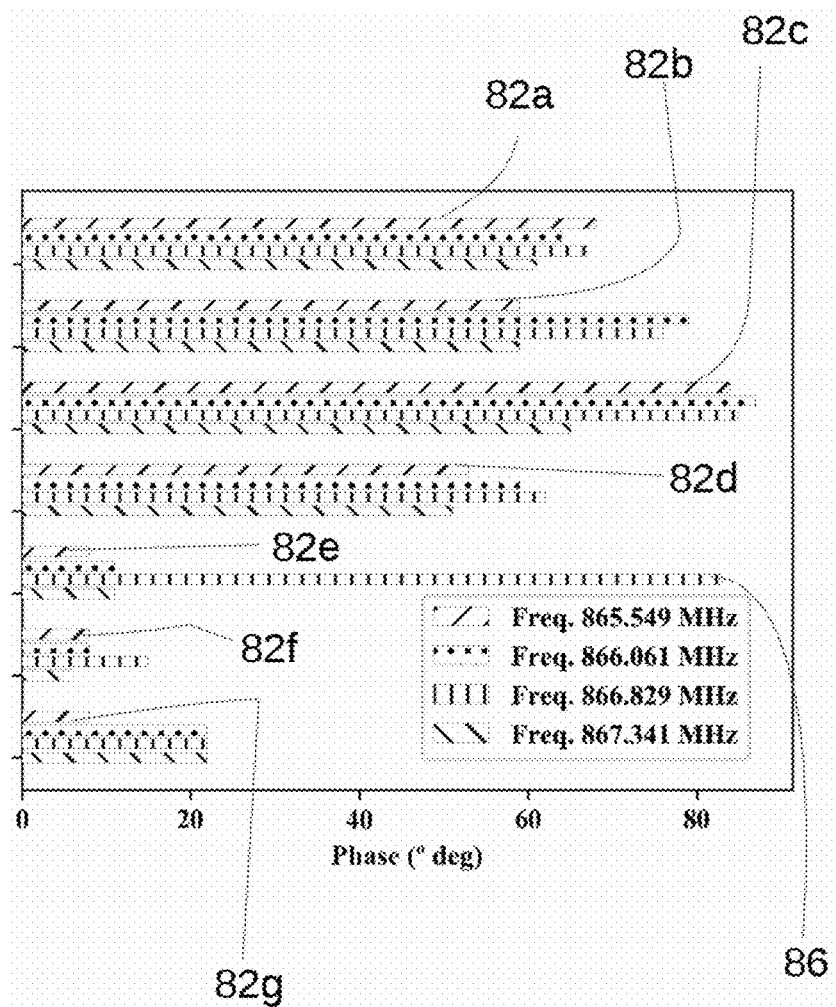
FIG. 4d shows a graphical diagram of a difference between the phase value of the selected response signal from the sensor element which is shielded against liquid and the phase value of the selected response signal from the sensor element which is not shielded against, in different frequency channels, of the sensor for detecting moisture, according to some examples.

FIG. 4d shows a graphical diagram of a phase difference between the phase value of the selected response signal from the sensor element which is shielded against liquid and the phase value of the selected response signal from the sensor element which is not shielded against, in different frequency channels, of the sensor for detecting moisture, according to some examples.

The charts 82a-82c refer to "dry" test i.e. a test where there is no presence of moisture and the charts 82d-82fg refer to "wet" test i.e. a test where there is presence of moisture.

In an example (see chart 82a), the phase difference (degrees) between the phase value (degrees) of the selected response signal of the sensor element which is shielded against moisture and the phase value (degrees) of the selected response signal from the sensor element which is not shielded against is around 70 degrees. In a further example (see chart 82b), the phase difference (degrees) between the phase numerical value (degrees) of the selected response signal of the sensor element which is shielded against moisture and the phase numerical value (degrees) of the selected response signal from the sensor element which is not shielded against is around 60 degrees. In another example (see chart 82c), the phase difference (degrees) between the phase numerical value (degrees) of the selected response signal of the sensor element which is shielded against moisture and the phase numerical value (degrees) of the selected response signal from the sensor element which is not shielded against is around 80 degrees. A threshold may thus be set e.g. at 60 degree. Phase numerical values below this threshold may determine the presence of moisture and phase numerical values above this threshold may determine the non-presence of moisture.

In another example (see chart 82d), the phase difference (degrees) between the phase numerical value (degrees) of the selected response signal of the sensor element which is shielded against moisture and the phase numerical value (degrees) of the selected response signal from the sensor element which is not shielded against is around 50 degrees. In another example (see charts 82e-82g), the phase difference (degrees) between the phase numerical value (degrees) of the selected response signal of the sensor element which is shielded against moisture and the phase numerical value (degrees) of the selected response signal from the sensor element which is not shielded against is around 10 degrees. Since the phase differences, in all the "wet" test, are below the above-commented threshold of e.g. 60 degrees, it may be determined that the sensor is wet i.e. there is moisture present in the sensor, in each test.

The same is true for any of the remaining frequency channels (e.g. in FIG. 4c, 866.061 Mhz, 866.829 Mhz, 867.341 MHz). Using one of the first three "dry" test, a threshold may be set. Since the phase difference in any of the last three "wet" test is below such threshold, the presence of moisture is determined.

It is further noted that, for any of the frequencies, if a threshold is set by any of the "dry" test but a phase result of any of the "wet" test includes a predefined deviation with respect to such threshold e.g. a phase value above such threshold, a false negative may be determined. This is the case, for example, of the "wet" test related to chart 86. In such "wet" test, the value of the phase is above the predefined threshold. Apparently, this should indicate the non-presence of moisture, however, a "false" negative has been determined. In this case, a further test for determining moisture as hereinbefore described with reference to FIG. 4b may be applied.

Figure 5:
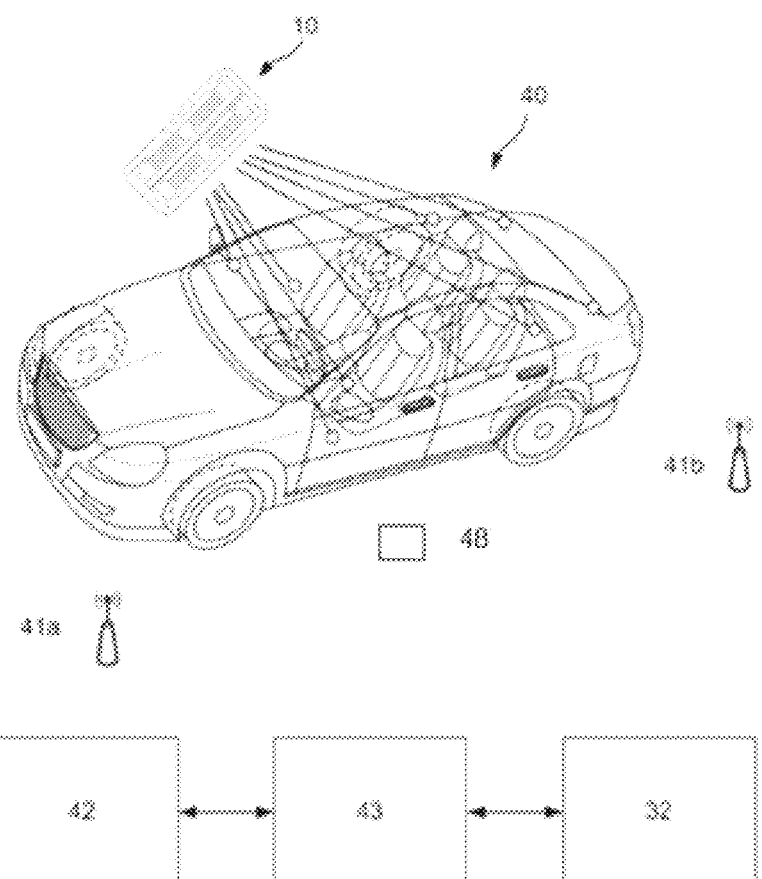
FIG. 5 illustrates a schematic diagram of a system for detecting moisture applied to an assembly process of vehicles with the aim of detecting water leakages inside the vehicle.

FIG. 5 illustrates a schematic diagram of a system for detecting moisture applied to an assembly process of vehicles with the aim of detecting water leakages inside the vehicle.

Following, an example of use of a system for detecting a moisture as hereinbefore described (see FIG. 2 and the paragraphs accompanying this FIG.) will be disclosed according to FIG. 5. This example is based on an assembly line of vehicles, for example, cars, with the aim of automatically and in unassisted manner detecting water leakage inside de vehicles in the assembly line using a "sealing test".

Particularly one or more moisture sensor 10 (forming part of the system for detecting moisture) as hereinbefore described may be located inside of the vehicle to be tested. Such system for detecting moisture may be able to measure water leakages inside the car while the car is in movement (since the "sealing or water tests" are currently performed without stopping the vehicle for measurement). Thus, the system is compatible with current industry processes.

Due to the fact that the previously disclosed moisture sensors 10 are used, the detection is performed by low cost (<10 cents of euro) battery-less sensors that are pre-deployed inside the vehicle during the manufacturing process. Those moisture sensors, after a "sealing test", are polled by RFID reader(s) in order to determine if any water leakage has occurred. The system detects levels of moisture corresponding to a leakage and automatically may locate their position without human intervention. The operator is warned by the system about a detected moisture and its location without the need to enter inside the vehicle. The moisture sensors may be deployed inside the vehicle under manufacturing. Moreover, the used moisture sensors do not need to be removed by the operators at the end of the assembly or testing tasks.

As can be seen in FIG. 5, one or more moisture sensor 10 as hereinbefore described may be situated inside a vehicle 40, in places where it is important to check whether water has been leaked during the assembly procedures (e.g. during a "sealing or water test"). These moisture sensors may be placed ad-hoc by the car manufacturer or enter the assembly line integrated with the car elements from different suppliers. In this example, each sensor element 11,14 of each moisture sensor 10 may include an RFID label, more specifically, an UHF passive RFID label.

Moreover, a reader module 32 as hereinbefore described may include two antennas 41a-41b. The antennas point to the assembly line and are able to retrieve information from the moisture sensors 10 located inside the car. The position of the antennas should allow all the moisture sensors inside the car to be read. The reader module is easily integrable in the production assembly line, for example, as an arch of antennas, each of which is configured to send energy to the RFID labels using radiofrequency waves, sending requests to the labels and receiving the response signals from the labels.

The reader module also may include a radio frequency module 42 responsible to transform information to/from radio frequency waves. Each antenna is connected to the radio frequency module 42. The reader module may also include electronic module 43 that is responsible to transmit information between the radio frequency module and the control module 32.

The connection between each antenna and the radio frequency module 42 may be wired (for example, through a coaxial cable configured to transport RF signals between the antenna and the reader).

In this example, a single moisture sensor 10 may be provided and a water test arrangement 48 may be situated in the assembly line. A first antenna 41b may be situated upstream of the water test arrangement 48. A second antenna 41a may be situated downstream of the water test arrangement 48. The assembly line may be provided with a vehicle transfer mechanism (not shown) configured to displace the vehicle from the first antenna 41a to the second antenna 41 through the water test arrangement. The vehicle may be displaced in the XYZ dimension along the assembly line using such vehicle transfer mechanism.

As the car 40 approaches to the first antenna, the first antenna 41b (and thus the reader module) may start to interrogate the element which not shielded against moisture and the element which is shielded against moisture, both forming part of the sensor 10. As a result, the antenna 41b may receive a plurality of response signals as the car approaches to the antenna 41b, passes in front of the antenna 41b and is displaced further away from the antenna 41b by the transfer mechanism. Particularly, the antenna 41b may receive a plurality of response signals from the sensor element which is not shielded against moisture and a plurality of response signals from the sensor element which is shielded against moisture, both forming part of the sensor 10.

At this point, samples may be generated for each received response signal of the sensor elements, as hereinbefore described. For instance, a first sample from a moisture sensor A may include the following information:

$$A^1 := \{Time^1_1, EPC^1_1, RSSI^1_1, PHASE^1_1, X^1_1, Time^1_2, EPC^1_2, RSSI^1_2, PHASE^1_2, X^1_2\}$$

in which 1 relates to the non-shielded sensor element 11 and 2 relates to the shielded sensor element 14 of the moisture sensor A. Evidently, further samples may include similar information.

For each set of samples from each sensor $A := \{A^1, A^2, A^3, \ldots A^n\}$ the control module 32 may consider the following information:
the position of the labels: $f_{position}\{A\}$;
information on the returned RSSI numerical values: $f_{RSSI}\{A\}$;
information on the returned PHASE numerical values: $f_{PHASE}\{A\}$;
information on other retrieved numerical values: $f_{OTHER}\{A\}$.

Then, a response signal from the plurality of response signals received from the sensor element which is not shielded against moisture may be selected by the control module, as hereinbefore described with reference to either FIG. 3a or FIG. 3b. Similarly, a response signal from the plurality of response signals received from the sensor element which is shielded against moisture may be selected by the control module, as hereinbefore described with reference to either FIG. 3a or FIG. 3b.

As a result, the response signal of the sensor element which is not shielded against moisture and the response signal of the sensor element which is shielded against moisture, both corresponding to the position of the moisture sensor closest to the antenna 41b, as the sensor is displaced in the XYZ dimension along the assembly line, may be selected. A sample associated with the selected response signals is thus also obtained. A control module 32 may receive the selected sample and it may determine the presence of moisture (before the water test arrangement) as hereinbefore described:

$$Test(A) = f(f_{position}\{A\}, f_{RSSI}\{A\}, f_{PHASE}\{A\}, f_{OTHER}\{A\}) = \{WET, DRY\}$$

Particularly, the non-presence of moisture may be determined as hereinbefore described with reference to FIGS. 4a-4d. Particularly, a numerical value related to a feature of the selected response signal of the sensor element which is shielded against liquid is obtained. A numerical value related to a feature of the selected response signal of the sensor element which is not shielded against liquid may also be obtained. Then, a difference between the obtained numerical value related to the feature of the selected response signal from the sensor element which is shielded against liquid to reach the numerical value of the feature and the obtained numerical value related to the feature of the selected response signal from the sensor element which is not shielded against liquid may be determined. Such difference may be used to set a threshold numerical value. Differences above or below such threshold (after the water test arrangement 48) may thus indicate the presence of moisture.

Following the example, the vehicle is further displaced towards the water test arrangement 48. Once the vehicle has passed the water test arrange 48, the vehicle is displaced towards the second antenna 41a.

Similarly as before, as the vehicle 40 approaches to the second antenna 41a, the second antenna 41a (and thus the reader module) may start to interrogate the element which not shielded against moisture and the element which is shielded against moisture, both forming part of the sensor 10. As a result, the antenna 41a may receive a plurality of response signals as the car gets close to the antenna 41a, passes in front of the antenna 41a and is displaced further away from the antenna 41a by the transfer mechanism. Particularly, the antenna 41a may receive a plurality of response signals from the sensor element which is not shielded against moisture and a plurality of response signals from the sensor element which is shielded against moisture, both forming part of the sensor 10.

At this point, samples may be generated for each received response signal of the sensor elements forming part of the sensor 10, as hereinbefore described.

Then, a response signal from the plurality of response signals received from the sensor element which is not shielded against moisture may be selected by the control module, as hereinbefore described (see FIGS. 3a-3b and the paragraphs accompanying these FIGS.). Similarly, a response signal from the plurality of response signals received from the sensor element which is not shielded against moisture may be selected by the reader module 31 (see FIGS. 3a-3b and the paragraphs accompanying these FIGS.).

As a result, the response signal of the sensor element which is not shielded against moisture and the response signal of the sensor element which is shielded against moisture, both corresponding to the position of the moisture sensor closest to the antenna 41a, may be obtained. A sample associated with the selected response signals is thus also obtained. A control module 32 may process the selected sample and it may determine the presence of moisture (after the test arrangement) as hereinbefore described:

$$\text{Test}(A) = f(f_{position}\{A\}, f_{RSSI}\{A\}, f_{PHASE}\{A\}, f_{OTHER}\{A\}) = \{\text{WET, DRY}\}$$

Particularly, a difference a between an obtained numerical value related to the feature of the selected response signal from the sensor element which is shielded against liquid to reach the numerical value of the feature and an obtained numerical value related to the feature of the selected response signal from the sensor element which is not shielded against liquid may be determined as hereinbefore described with reference to FIGS. 4a-4d. The presence of moisture may be determined based on such difference. For example, if the difference is above or below the previously set time threshold, the presence of moisture may be determined.

In some examples, a method for detecting moisture may be performed again using the test described with reference to the FIGS. 4a-4d for higher accuracy.

In summary, the disclosed system for detecting a water leakage in a vehicle production line offers the following advantages that may be described in three points:
- on one hand, improved automatization reduces errors due to human intervention in the production chain, also reducing production time, and thus costs;
- also, the moisture sensors are based on off-the-self RFID labels as sensor elements 11,14, which reduces the moisture sensor cost;
- on the other hand, the solution based on standards allows for better integration in the industry (e.g. provider independence).

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A system for detecting moisture comprising:
one or more moisture sensors comprising:
at least one sensor element which is not shielded against liquid, the sensor element which is not shielded against liquid comprising:
a first RFID label comprising at least an antenna, and an element made of a liquid absorbing material, the liquid absorbing material being configured to absorb and drive liquid to and into contact with the antenna of the first RFID label, in response to the liquid coming into contact with the antenna of the first RFID label, the strength and/or the phase of a response signal of the antenna is modified;
at least one sensor element which is shielded against liquid, the sensor element shielded against liquid comprising at least an antenna and an element made of a liquid proof material,
a control module comprising a reader module, the reader module being configured to receive a plurality of response signals from the sensor element which is not shielded against liquid and to receive a plurality of response signals from the sensor element which is shielded against liquid, the control module being configured to:

receive a plurality of response signals of the sensor element which is not shielded against liquid, the response signals of the sensor which is not shielded against liquid comprising a feature, the feature of each received response signal being the same feature;
select a response signal of the received plurality of response signals of the sensor element which is not shielded against liquid based on the feature of the response signals, the selected response signal corresponding to a maximum value of the feature of the selected response signal with respect to the value of the feature of some or all of the other received response signals;
receive a plurality of response signals of the sensor element which is shielded against liquid, the response signals of the sensor element which is shielded against liquid comprising a feature which is the same feature as the feature of the received response signals of the sensor element which is not shielded against liquid;
select a response signal of the received plurality of response signals of the sensor element which is shielded against liquid based on the feature of the response signals, the selected response signal corresponding to a maximum value of the feature of the selected response signal with respect to the value of the feature of some or all of the other received response signals;
obtain a numerical value related to the feature of the selected response signal of the sensor element which is shielded against liquid;
obtain a numerical value related to the feature of the selected response signal of the sensor element which is not shielded against liquid;
determine a difference between the obtained numerical value related to the feature of the selected response signal from the sensor element which is shielded against liquid and the obtained numerical value related to the feature of the selected response signal from the sensor element which is not shielded against liquid;
determine a detection of moisture based on the determined difference being above or below a threshold.

2. A system according to claim 1, the feature of the received response signals comprising:
the signal strength; or
the signal phase.

3. A system according to claim 2, the numerical value related to the feature of the selected response signal of the sensor element which is shielded against liquid and the numerical value related to the feature of the selected response signal of the sensor element which is not shielded against liquid comprising:
the signal strength when the feature of the selected response is the signal strength; or
the signal phase when the feature of the selected response signal is the signal phase.

4. A system according to claim 2, further including:
the control module being configured to obtain a numerical value related to the feature of the selected response signal of the sensor element which is shielded against liquid further comprising
the control module being configured to obtain the time employed by the feature of the selected response signal from the sensor element which is shielded against liquid to reach the numerical value of the feature, the control module being configured to obtain a numerical value related to the feature of the selected response signal of the sensor element which is not shielded against liquid further comprising the control module being configured to obtain a time employed by the feature of the selected response signal from the sensor element which is not shielded against liquid to reach the numerical value of the feature, the control module being configured to determine a difference between the obtained numerical value related to the feature of the selected response signal from the sensor element which is shielded against liquid and the obtained numerical value related to the feature of the selected response signal from the sensor element which is not shielded against liquid further comprising the control module being configured to determine a time difference between the time employed by the feature of the response signal from the sensor element which is shielded against liquid to reach the numerical value of the feature and the time employed by the feature of the response signal from the sensor element which is not shielded against liquid to reach the numerical value of the feature, the control module being configured to determine a detection of moisture if the determined difference is above or below a threshold further comprising the control module being configured to determine the detection of moisture if the determined time difference is above or below a time threshold.

5. A system according to claim 4, the control module being configured to select a response signal of the received plurality of response signals of the sensor element which is not shielded against liquid based on the strength of the response signals further comprising:

the control module being configured to compare the strength of all the received plurality of response signals to select a response signal corresponding to a maximum signal strength numerical value.

6. A system according to claim 5, the control module being configured to select a response signal of the received plurality of response signals of the sensor element which is shielded against liquid based on the strength of the response signals further comprising:

the control module being configured to compare the strength of all the received plurality of response signals to select a response signal corresponding to a maximum signal strength numerical value.

7. A system according to claim 4, the control module being configured to select a response signal of the plurality of received response signals of the sensor element which is not shielded against liquid based on the phase of the response signals further comprising:

the control module being configured to identify a local maximum phase in some of the received response signals, the local maximum phase characterized by a first and second time period, where in the first time period, the phase of the received response signals raises from an initial phase to a maximum phase, and where in the second time period the phase decreases from the maximum phase to the initial phase, the end of the first period of time and the beginning of the second period of time being the same, and the control module being configured to select a response signal corresponding to the local maximum phase.

8. A system according to claim 7, the control module being configured to select a response signal of the plurality of received response signals of the sensor element which is shielded against liquid based on the phase of the response signals further comprising:

the control module being configured to identify a local maximum phase in some of the received response signals, the local maximum phase characterized by a first and a second time period, where in the first time period, the phase of the response signals raises from an initial phase to a maximum phase, and where in the second time period the phase decreases from the maximum phase to the initial phase, the end of the first period of time and beginning of the second period of time being the same, and the control module being configured to select a response signal corresponding to the maximum phase.

9. A system according to claim 1, the sensor element which is not shielded against liquid and the sensor element which is shielded against liquid being placed next to each other at a distance of either or both between 0.01 centimeters and 30 centimeters, or between 0.1 centimeters and 5 centimeters.

10. A method of detecting moisture executable by a control module comprised in a system for detecting moisture according to claim 1, the method comprising:

receiving a plurality of response signals of the sensor which is not shielded against liquid, the response signals of the sensor which is not shielded against liquid comprising a feature, the feature of each received response signal being the same feature;

selecting a response signal of the received plurality of response signals of the sensor element which is not shielded against liquid based on the feature of the response signals, the selected response signal corresponding to a maximum value of the feature of the selected response signal with respect to the value of the feature of some or all of the other received response signals;

receiving a plurality of response signals of the sensor element which is shielded against liquid, the response signals of the sensor element which is shielded against liquid comprising a feature which is the same feature as the feature of the received response signals of the sensor element which is not shielded against liquid;

selecting a response signal of the received plurality of response signals of the sensor element which is shielded against liquid based on the feature of the response signals, the selected response signal corresponding to a maximum value of the feature of the selected response signal with respect to the value of the feature of some or all of the other received response signals;

obtaining a numerical value related to the feature of the selected response signal of the sensor element which is shielded against liquid;

obtaining a numerical value related to the feature of the selected response signal of the sensor element which is not shielded against liquid;

determining a difference between the obtained numerical value related to the feature of the selected response signal from the sensor element which is shielded against liquid and the obtained numerical value related to the feature of the selected response signal from the sensor element which is not shielded against liquid;

determining a detection of moisture based on the determined difference being above or below a threshold.

11. A method according to claim 10, the feature of the response signal comprising:

the signal strength; or the signal phase.

12. A method according to claim 11, the selecting a response signal of the plurality of received response signals of the sensor element which is not shielded against liquid based on the strength of the response signals comprising:

comparing the strength value of all the received response signals to select a response signal corresponding to a maximum signal strength value.

13. A method according to claim 11, the selecting a response signal of the plurality of received response signals of the sensor element which is shielded against liquid based on the strength of the response signals comprising:

comparing the strength value of all the received response signals to select a response signal corresponding to a maximum signal strength value.

14. A method according to claim 11, the selecting a response signal of the plurality of received response signals of the sensor element which is not shielded against liquid based on the phase of the response signals comprising:

identifying a local maximum phase in some of the received response signals, the local maximum phase characterized by a first and second time period, where in the first time period, the phase of the response signals raises from an initial phase to a maximum phase, and where in the second time period the phase decreases from the maximum phase to the initial phase, the end of the first period of time and the beginning of the second period of time being the same, and selecting a response signal corresponding to the local maximum phase.

15. A method according to claim 11, the selecting a response signal of the plurality of received response signals of the sensor element which is shielded against liquid based on the phase of the response signals comprising:

identifying a local maximum phase in some of the received response signals, the local maximum phase characterized by the first and second period, where in the first time period, the phase of the response signals raises from an initial phase to a maximum phase, and where in the second time period the phase decreases from the maximum phase to the initial phase, the end of the first period of time and the beginning of the second period of time being the same, and selecting a response signal corresponding to the maximum phase.

* * * * *